(12) United States Patent
Jo et al.

(10) Patent No.: US 10,266,431 B2
(45) Date of Patent: Apr. 23, 2019

(54) WATER TREATMENT APPARATUS PRODUCING NO HARMFUL SUBSTANCES

(71) Applicant: IOREX CO., LTD, Jeonju-si, Jeollabuk-do (KR)

(72) Inventors: Tai-hyun Jo, Jeonju-si (KR); Hong-seok Kim, Gimpo-si (KR); Jee-woon Kim, Jeonju-si (KR)

(73) Assignee: IOREX Co., Ltd., Jeonju-si (KR)

( * ) Notice: Subject to any disclaimer, the term of this patent is extended or adjusted under 35 U.S.C. 154(b) by 182 days.

(21) Appl. No.: 15/538,587

(22) PCT Filed: Sep. 19, 2016

(86) PCT No.: PCT/KR2016/010403
§ 371 (c)(1),
(2) Date: Jun. 21, 2017

(87) PCT Pub. No.: WO2017/052142
PCT Pub. Date: Mar. 30, 2017

(65) Prior Publication Data
US 2017/0341957 A1  Nov. 30, 2017

(30) Foreign Application Priority Data

Sep. 23, 2015 (KR) .................. 10-2015-0134380

(51) Int. Cl.
*C02F 1/48* (2006.01)
*C02F 5/00* (2006.01)
(Continued)

(52) U.S. Cl.
CPC .................. *C02F 1/48* (2013.01); *C02F 1/70* (2013.01); *C02F 5/00* (2013.01); *C22C 9/04* (2013.01);
(Continued)

(58) Field of Classification Search
CPC ...... C02F 1/70; C02F 1/48; C02F 5/00; C02F 2201/48; C02F 2307/14; C02F 2101/20;
(Continued)

(56) References Cited

U.S. PATENT DOCUMENTS 5,681,457 A  * 10/1997  Mahoney .................. C02F 1/48
                                                         204/660
5,695,644 A  * 12/1997  Buchanan ................. C02F 1/48
                                                         204/554

(Continued)

FOREIGN PATENT DOCUMENTS

JP         2012157852 A  *  8/2012
KR         100862970 B1  * 10/2008  ................ C02F 1/48

*Primary Examiner* — Walter D. Griffin
*Assistant Examiner* — Cameron J Allen
(74) *Attorney, Agent, or Firm* — Lewis Roca Rothgerber Christie LLP

(57) ABSTRACT

Disclosed is a water treatment apparatus including a pipe. Elements disposed in the pipe are respectively made of lead-free brass and nontoxic ultra high molecular weight polyethylene instead of brass and plastic polyethylene that are conventionally used materials. Therefore, when the elements come into contact with water, neither heavy metals, such as lead (Pb), nor organic and inorganic substances harmful to the human body are produced.

1 Claim, 4 Drawing Sheets

(51) Int. Cl.
    *C02F 1/70*     (2006.01)
    *C22C 9/04*     (2006.01)
    *F16L 9/147*    (2006.01)
    *C02F 101/20*   (2006.01)

(52) U.S. Cl.
    CPC .......... *F16L 9/147* (2013.01); *C02F 2101/20* (2013.01); *C02F 2201/48* (2013.01); *C02F 2303/08* (2013.01); *C02F 2303/20* (2013.01); *C02F 2303/22* (2013.01); *C02F 2307/14* (2013.01)

(58) Field of Classification Search
    CPC .............. C02F 2303/08; C02F 2303/20; C02F 2303/22; C22C 9/04; F16L 9/147
    See application file for complete search history.

(56)           References Cited

U.S. PATENT DOCUMENTS

2006/0011557 A1*  1/2006  Cho .......................... C02F 1/48
                                                             204/660
2017/0341957 A1* 11/2017  Jo ............................ C02F 1/70

* cited by examiner

[Fig. 1]
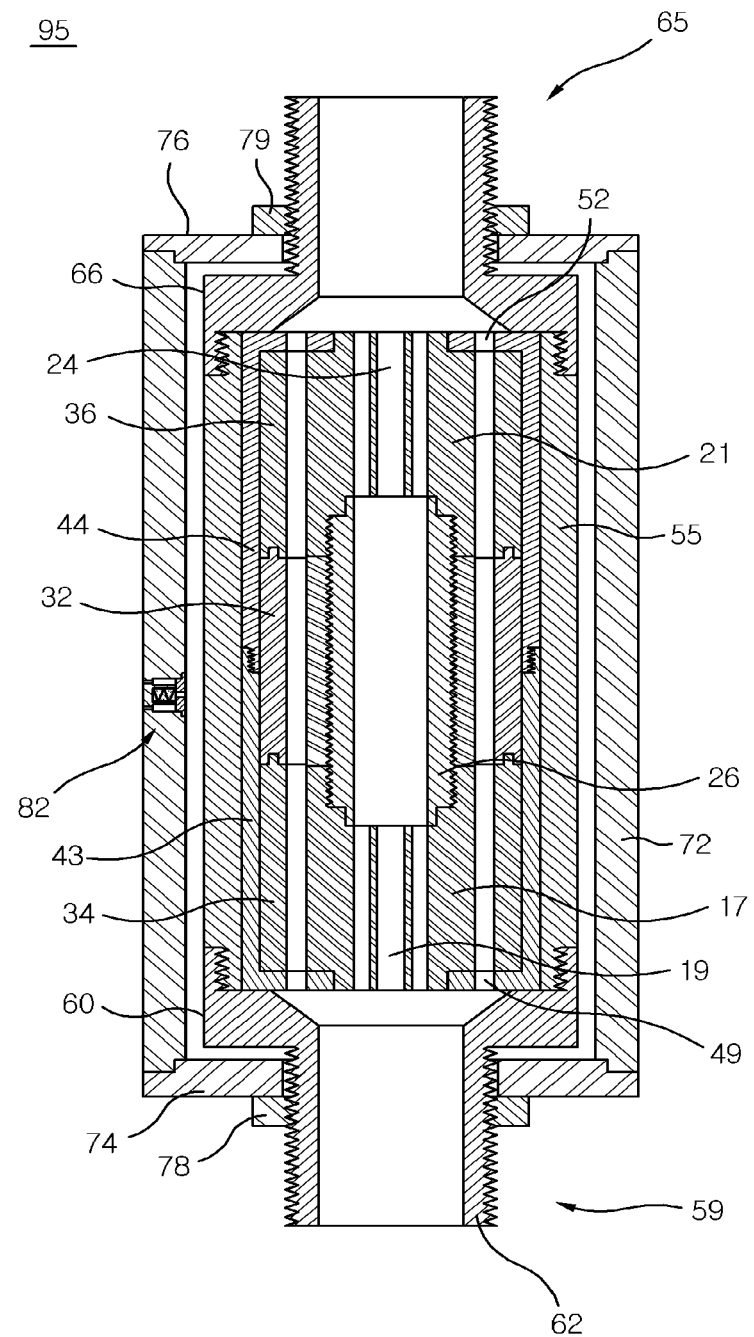

[Fig. 2]
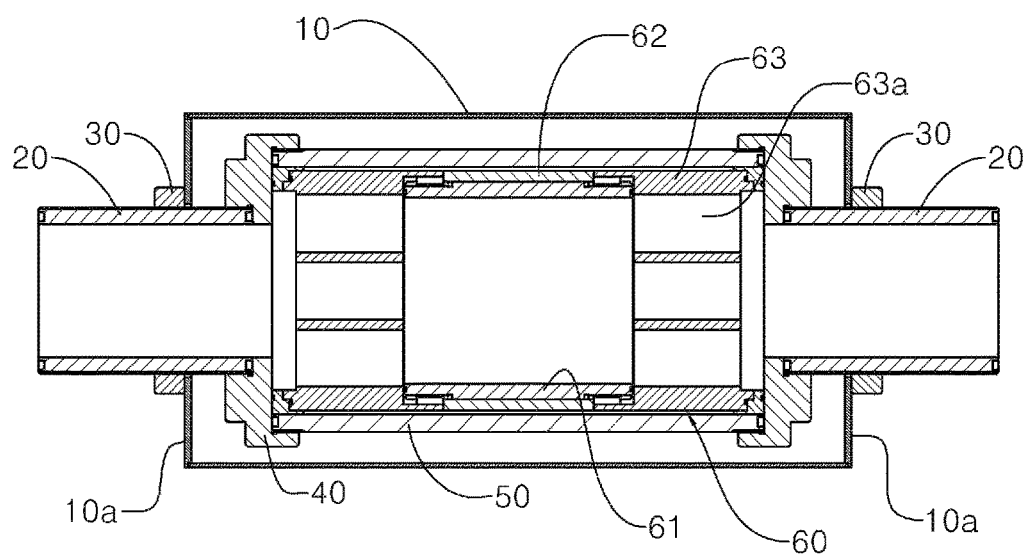
[Fig. 3]
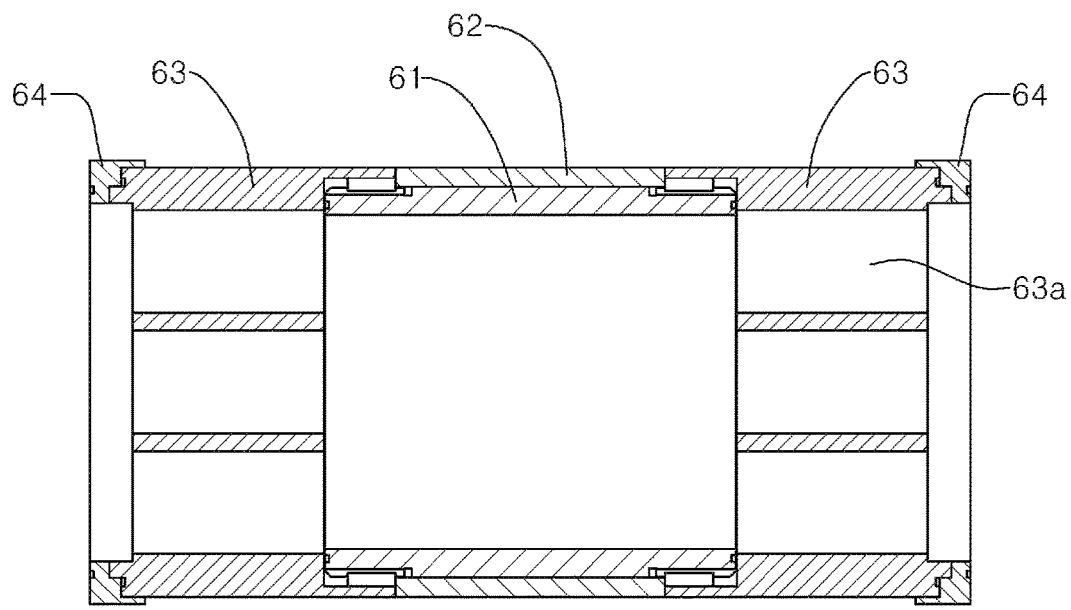

[Fig. 4]
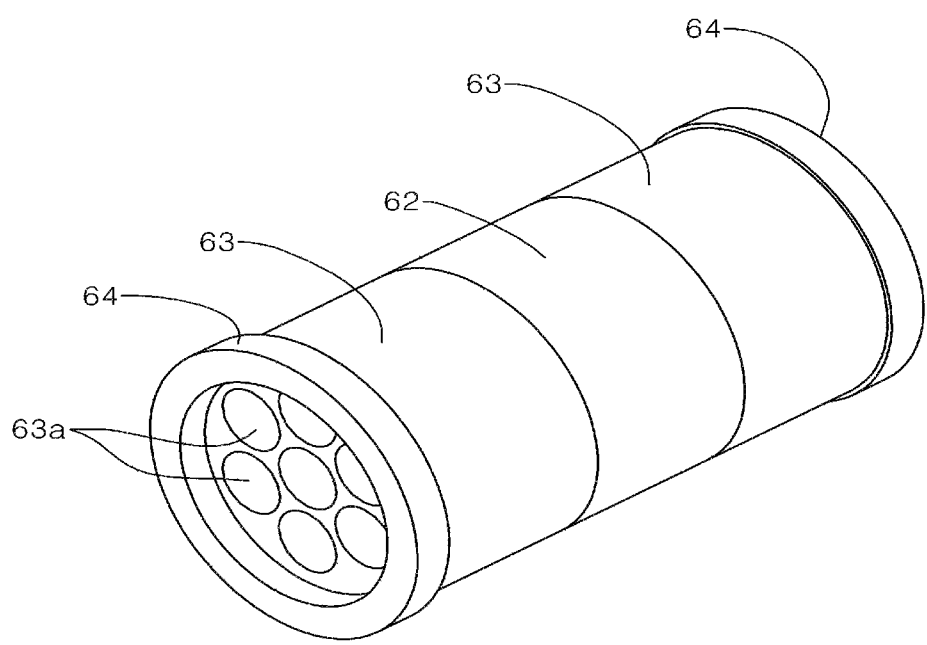
[Fig. 5]
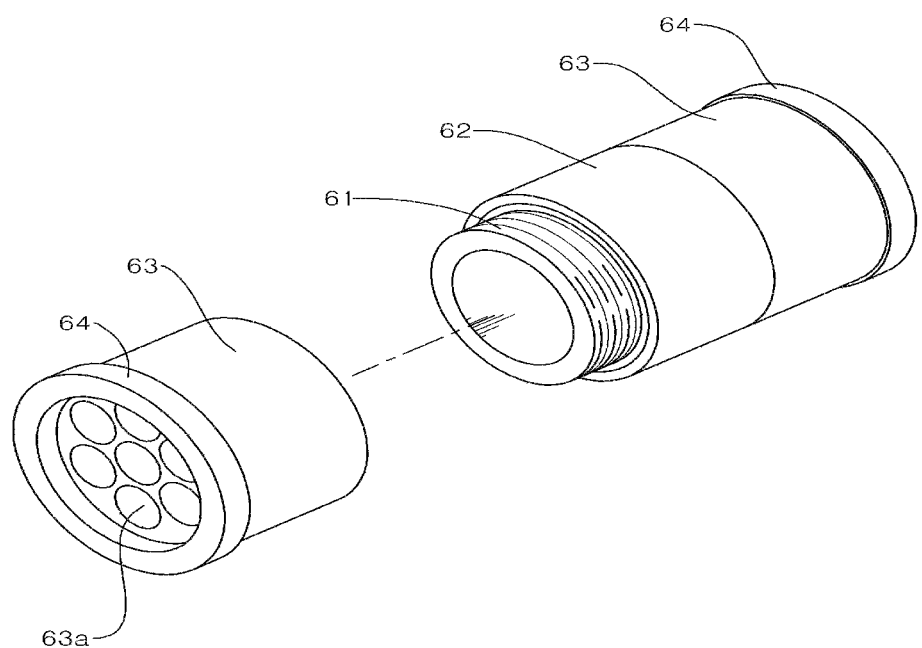

[Fig. 6]

WATER TREATMENT APPARATUS PRODUCING NO HARMFUL SUBSTANCES

CROSS-REFERENCE TO RELATED APPLICATION(S)

This application is a National Phase Patent Application of International Patent Application Number PCT/KR2016/010403, filed on Sep. 19, 2016, which claims priority of Korean Patent Application 10-2015-0134380, filed Sep. 23, 2015. The entire contents of both of which are incorporated herein by reference.

TECHNICAL FIELD

The present invention relates to a water treatment apparatus for treating water without producing harmful substances. More particularly, the present invention relates to a water treatment apparatus that prevents generation of heavy metals, such as lead, and organic and inorganic substances which are likely to occur when materials such as metals or plastic come into contact with water in a pipeline, thereby treating water without producing harmful substances.

BACKGROUND ART

Generally, when water pipes such as water service pipes, or feed water pipes and drain pipes connected to water tanks, are used for a long period, reactive oxygen in water flowing through such a pipe reacts with iron contained in the material of the pipe, so that the inside surface of the pipe is corroded or rusted. Thus, rust or foreign substances accumulate on the inside surface of the pipe, thereby forming scale, slime, or slurry, which shortens the life span of the pipe and impedes the flow of water. In this case, there is a problem that substances such as iron oxides, impurities, bacteria, and viruses that are harmful to the human body are dissolved or mixed in the water flowing through the pipe, thus making the water unsanitary.

In order to remove unsanitary factors in pipes, a cleaning tool such as a brush is inserted into pipes to remove rust or scale. Meanwhile, when corrosion of the inside surface of a pipe is extreme, the corroded pipe is replaced with a new one to remove unsanitary factors. However, although this method can temporarily eliminate unsanitary factors, long service times, considerable labor, and large equipment are required to clean or replace corroded pipes. Furthermore, such cleaning of contaminated pipes or replacement of corroded pipes needs to be repeatedly performed in short time cycles, and thus are inefficient and incur large maintenance costs.

Therefore, to prolong the life span of a pipe and remove unsanitary factors, a pipe cleaning agent (so-called drain opener), or a water treatment apparatus using a high-frequency oscillator is used. However, the method of using a pipe cleaning agent causes problems associated with chemicals, and an apparatus such as a high frequency generator requires driving force, thereby consuming a large amount of energy, and has a complex structure.

For this reason, in recent industrial sites, an ionizing scale removing system that is a powerless eco-friendly system is used. This system includes an electrostatic generator that generates static electricity to ionize water with an electrostatic field. The generated ions purify water and clean pipes.

Ionization of water may be properly construed as molecules with electric charges. Since a material sample needs to be electrically neutral, an ionized compound includes both of positive ions (positively charged particles) and negative ions (negatively charged particles). In the case of water, ionized water contains $H^+$ as positive ions and $OH^-$ as negative ions. Water ionization is based on Fleming's rule in which electromotive force is induced when water, a conductive material, passes through a magnetic field. That is, water $H_2O$ is ionized into H+ and OH− through reactions such as concentration, collision, etc. of ions dissolved in water, which is attributable to Lorenz electric field induced by an electric potential that is generated when water passes through an ultrahigh magnetic field (orthogonal to lines of magnetic force). This water is called ion activated water.

As a conventional art based on this principle, Patent Document 1 (Korean Patent No. 10-1326144) discloses a scale removing system for a pipe, the system including an electrostatic generation pipe, an electrostatic generator, a heat insulation unit, a housing, a first housing connection unit, and a second housing connection unit. The electrostatic generation pipe includes a hollow metal pipe arranged at a center portion thereof and first and second hollow carbon pipes connected to respective ends of the metal pipe. The electrostatic generator includes: a metal body having an inner fluid channel through which water can flow, installed in the electrostatic generation pipe, and spaced from the inside surface of the electrostatic generation pipe to provide an outer fluid channel between its outside surface and the inside surface of the electrostatic generation pipe such that water can flow through the outer fluid channel; a first carbon body having a fluid channel through which water can pass and connected to a first end of the metal body; and a second carbon body having a fluid channel through which water can pass and connected to a second end of the metal body. The heat insulation unit includes: a heat insulation pipe having an internal accommodation space to accommodate the electrostatic generation pipe in which the electrostatic generator is installed; a first cover and a second cover attached to respective ends of the heat insulation pipe; a first inflow passage formed in the first cover at a center portion thereof so as to communicate with the fluid channel of the first carbon body; a second inflow passage formed in the first cover, around the first inflow passage and at a periphery portion of the first cover, so as to communicate with the outer fluid channel provided between the inside surface of the electrostatic generation pipe and the outside surface of the electrostatic generator; a first outflow passage formed in a center portion of the second cover so as to communicate with the fluid channel of the second carbon body; and a second outflow passage formed in a periphery portion of the second cover, around the first outflow passage, so as to communicate with the outer fluid channel provided between the inside surface of the electrostatic generation pipe and the outside surface of the electrostatic generator. The housing has an internal accommodation space to accommodate the insulation member. The first housing connection unit is arranged at a first end of the housing and provided with a fluid channel that communicates with the first inflow passage and the second inflow passage of the heat insulation unit. The second housing connection unit is arranged at a second end of the housing and is provided with a fluid channel that communicates with the first outflow passage and the second outflow passage.

The scale removing system is installed in the middle of a pipe, thereby removing scale generated in the pipe which constitutes a pipe system, and inhibiting generation of scale or rust in the pipe. However, since the scale removing system includes a metal body or a metal pipe made of brass, the brass comes into contact with water flowing through the brass pipe. Therefore, heavy metals such as lead (Pb) contained in the brass are eluted and dissolved in water and organic and inorganic substances harmful to the human body are generated.

Accordingly, development of a water treatment apparatus to which new technologies for solving the above problems are applied is urgently required.

DISCLOSURE

Technical Problem

Accordingly, the present invention has been made keeping in mind the above problems occurring in the related art, and an object of the present invention is to provide a water treatment apparatus for treating water without producing harmful substances, by using a pipe having an inner portion being in direct contact with water and being made of lead-free brass and nontoxic ultra high molecular weight polyethylene, thereby generating neither heavy metals nor organic and inorganic substances harmful to the human body.

Technical Solution

In order to accomplish the above object, the present invention provides a water treatment apparatus including: a hollow body casing (10) arranged at a middle portion of the water treatment apparatus and provided with side couplings (10a) combined with respective ends of the hollow body casing (10); a body holder (50) accommodated in the body casing (10) and connected to flange retainers (20) installed on left and right sides thereof via respective connection covers (40); a carbon pipe (63) accommodated in the body holder (50), having a water channel (63a) through which water flows, provided with covers (64) attached to left and right ends thereof, and generating static electricity in water; an aluminum rod (62) installed in a middle portion of the carbon pipe (63); and inner rods (61) installed inside the rod (62) at left and right end portions of the rod (62).

Technical solutions of the present invention are described in the detailed description.

Advantageous Effects

The water treatment apparatus for treating water without producing harmful substances, according to the present invention, has advantages described below.

First, unlike conventional water treatment apparatuses, a portion of the water treatment apparatus of the present invention, which comes into contact with water, is made of lead-free brass instead of brass that is a typical material for the conventional water treatment apparatuses, thereby not eluting heavy metals. Therefore, the apparatus of the present invention is sanitary.

Second, the portion of the water treatment apparatus of the present invention, which comes into contact with water, is made of ultrahigh molecular weight polyethylene that is non-toxic material and does not generate organic and inorganic substances. Therefore, the apparatus of the present invention is not harmful to the human body.

DESCRIPTION OF DRAWINGS

FIG. 1 is a partially exploded perspective view of a scale removing system according to a conventional art;

FIG. 2 is a schematic view illustrating an assembled state of a water treatment apparatus according to one embodiment of the present invention;

FIG. 3 is a cross-sectional view illustrating an assembled state of a carbon pipe;

FIG. 4 is a perspective view of the carbon pipe of the water treatment apparatus according to the present invention;

FIG. 5 is a diagram illustrating a disassembled state of the carbon pipe of the water treatment apparatus according to the present invention;

FIG. 6 is a test report confirming that a scale removing system to which the water treatment apparatus according to the present invention is applied complies with ANSI/NSF 61 that is the certification standard regarding water quality, established by American NSF International.

BEST MODE

Hereinafter, a water treatment apparatus for treating water without producing harmful substances, according to the present invention, will be described with reference to the accompanying drawings.

First, the water treatment apparatus for treating water without producing harmful substances, according to the present invention, includes: a hollow body casing 10 disposed at a middle portion of the water treatment apparatus and provided with side couplings 10a respectively combined with left and right ends of the body casing 10; a body holder 50 accommodated in the body casing 10 and connected to flange retainers 20, respectively installed on left and right sides of the body holder 50, via respective connection covers 40; and a carbon pipe 63 accommodated in the body holder 50, having a water channel 63a through which water flows, provided with covers 64 respectively attached to left and right ends of the carbon pipe 63, and generating static electricity in water. In addition, a rod 62 is installed in a middle portion of the carbon pipe 63, and inner rods 61 are installed inside the rod 62, at left and right end portions of the rod 62.

As illustrated in FIG. 2, the body casing 10 serves as an outer shell of the water treatment apparatus and is a hollow body. The body casing 10 is made of a metal or the like to protect the body holder 50. Specifically, the body casing 10 is made of stainless steel that has high strength and does not easily rust. The respective ends of the body casing 10 are open, and the side couplings 10a with central holes are combined with the respective ends of the body casing 10. The combined structure of the body casing 10 and the side couplings 10a forms an overall cylinder shape.

The body holder 50 made of brass is installed inside the body casing 10. The left and right ends of the body holder 50 are connected to the flange retainers 20 made of lead-free brass via the respective connection covers 40 made of lead-free brass. Water flows into the body holder 50 from one side thereof and flows out of the body holder from the other side thereof.

As illustrated in FIGS. 2 to 5, the carbon pipe 63 that generates static electricity in water is accommodated in the body holder 50. The carbon pipe 63 has a plurality of water channels 63a formed therein so that water can easily flow through the carbon pipe 63. The covers 64 are firmly fixed to the left and right ends of the carbon pipe 63 to prevent water from leaking.

The carbon pipe 63 is a conventional electrostatic generation element that generates an electrostatic field by friction with water. For example, as illustrated in FIGS. 2 and 3, static electricity is generated by friction with water at the contact surface of the carbon pipe 63 when water flows while being in contact with the carbon pipe 63. Thus, the static electricity, i.e. charge, is accumulated on the surface of the carbon pipe 63 (+) and discharged to the rod 62 (−). Thus, a high-voltage thin electrostatic field perpendicular to the flow of water is generated between the carbon pipe 63 and the rod 62. Thus, water that passes through this electrostatic field is ionized as shown by the chemical equation described below. In this case, since the carbon pipe 63 has a honeycomb structure including the multiple water channels 63a, the surface of the carbon pipe 63, which is in contact with water, is increased, and thus the amount of static electricity is increased.

$$H_2 \rightarrow H^+ + OH^-$$

The water treatment apparatus is installed such that the flange retainers 20 combined with the left and right sides of the body casing 10 are connected to various pipes or water supply and discharge devices. Water flowing through a pipe or a water supply and discharge device is introduced into the water channels 63a formed in the carbon pipe 63 through the flange retainer 20, and the water $H_2O$ is ionized into hydrogen ions $H^+$ and hydroxyl ions $OH^-$ through the action described above while passing through the water channels 63a of the carbon pipe 63.

The crystalline structure of water molecules in the water ionized by the carbon pipe 63 is finely split and the water molecules are more rapidly rotated, so that the ionized water changes to strongly activated water. In the activated water, the crystalline structure of water absorbs reactive oxygen, thereby deteriorating the activity of reactive oxygen which is a factor of rusting of a pipe, thereby preventing pipe rusting. In addition, the activated water removes or prevents contaminants such as scale from adhering to the inside surface of a pipe, thereby inhibiting growth of bacteria in water. In addition, large clusters of water molecules break into small clusters and the small clusters of water molecules are rapidly rotated in activated water containing ions. Therefore, this activated water is rapidly absorbed by cells of plants and animals including humans, and the absorbed activated water promotes growth of living bodies and contributes to activation of electrolyte. Thus, the absorbed activated water rapidly removes heavy metals and body wastes from living bodies and supply essential nutrients to the bodies such that the bodies are well balanced in nutrients.

The ionized water changes to strongly activated water having high activity because the crystalline structure of water molecules is finely split and the water molecules are rapidly rotated. In the activated water, the crystalline structure of water absorbs reactive oxygen, thereby deteriorating the activity of reactive oxygen which is a factor of rusting of a pipe, thereby preventing pipe rusting. In addition, since the ionized activated water can strongly attract oxygen and thus dissolves oxygen in water, the ionized water can cause a reduction reaction of changing red iron oxide ($Fe_2O_3$) to black iron oxide ($Fe_3O_4$), thereby removing rust. The rust removal reaction is represented by the following chemical equation:

$$3Fe_2O_3 \rightarrow 2Fe_3O_4 + 1/2O_2$$

On the other hand, the cover 64 is a molded article made of synthetic resin. The inside surface of an end portion of the cover 64 is threaded (not denoted by a reference character) so that the cover 64 can be easily assembled with the carbon pipe 63. When assembled, a rubber packing (not shown) such as an O-ring is disposed between the cover 64 and the carbon pipe 63 so that the cover 64 and the carbon pipe 63 can be securely assembled with each other. Thus, water can flow only through the water channel 63a in the carbon pipe 63 and cannot leak between the cover 64 and the carbon pipe 63.

In the case of the connection cover 40 and the flange retainer 20 made of brass, when the connection cover 40 and the flange retainer 20 come into contact with water, heavy metals such as lead (Pb) are eluted and dissolved in water. The water containing heavy metals is harmful to the human body. Therefore, to solve this problem, it is preferable that the connection cover 40 and the flange retainer 20 are made of lead-free brass. The lead-free brass may be a metal alloy containing copper (Cu) by 58.7316 wt %, lead (Pb) by 0.0035 wt %, iron (Fe) by 0.0182 wt %, tin (Sn) by 0.097 wt %, cadmium (Cd) by 0.0004 wt %, bismuth (Bi) by 1.0405 wt %, and zinc by the remaining proportion.

In addition, in the case in which the inner rod 61 and the cover 64 are made of polyethylene, when polyethylene comes into contact with water, organic and inorganic substances are eluted and dissolved in water. Since the water in which organic and inorganic substances are dissolved is harmful to the human body, it is preferable to use nontoxic engineering plastic as a new molding material. In this case, as the nontoxic engineering plastic, ultra high molecular weight polyethylene having a molecular weight of 5.0 to $6.8 \times 10^6$ is preferably used. This is because the ultra high molecular weight polyethylene has better mechanical properties, such as impact resistance, wear resistance, slip property compared to other engineering plastics due to its high molecular weight, is not harmful to the human body, and is lightweight with a specific gravity of 0.93. When the molecular weight of the ultra high molecular weight polyethylene is less than $5.0 \times 10^6$ or greater than $6.8 \times 10^6$, additives such as a stabilizer need to be added thereto, thereby generating substances harmful to the human body. Therefore, these ranges are not proper.

In addition, according to the water treatment apparatus of the present invention, the activated water prevents rusting, and water molecules having a fine crystalline structure tend to combine with atoms or molecules in water to form a large crystalline structure, thereby having solvency as high as pure water. Therefore, $H^+$ and $OH^-$ ions of water are easily combined with inorganic and organic substances dissolved in water, thereby detaching and removing contaminants or scale from a pipe, and inhibiting growth of pathogenic germs or bacteria. The water treatment apparatus is a powerless eco-friendly system.

The water treatment apparatus for treating water without producing harmful substances, according to the invention, acts as described above, can be used for a heat pump, a heat exchanger, or the like among various conventional ionization water treatment apparatuses.

To help understand the present invention, the water channel 63a of the water treatment apparatus of the invention was manufactured in various shapes, and a preferred embodiment thereof among them is disclosed here. However, the preferred embodiment is disclosed for only illustrative purposes and should not be construed as limiting the invention.

<Embodiment>

Among the elements of the water treatment apparatus for treating water without producing harmful substances, according to the present invention, the connection covers 40 and the flange retainers 20 are made of lead-free brass that is a metal alloy containing copper (Cu) by 58.7316 wt %, lead (Pb) by 0.0035 wt %, iron (Fe) by 0.0182 wt %, tin (Sn) by 0.097 wt %, cadmium (Cd) by 0.0004 wt %, bismuth (Bi) by 1.0405 wt %, and zinc (Zn) by the remaining proportion. The inner rod 61 and the cover 64 are made of non-toxic plastic. For example, the inner rod 61 and the cover 64 are made of ultra high molecular weight polyethylene having a molecular weight of $5.0 \times 10^6$.

COMPARATIVE EXAMPLE

As compared with the embodiment, a water treatment apparatus according to a comparative example is manufactured using materials described below. That is, connection covers 40 and flange retainers 20 are made of brass having a composition including copper (Cu) by 85 wt %, zinc (Zn) 11 wt %, lead (Pb) by 3 wt %, tin (Sn) by 0.1 wt %, aluminum (Al) by 0.2 wt %, iron (Fe) by 0.3 wt %, and nickel (Ni) by 0.4 wt %. An inner rod 61 and a cover 64 are made of high density polyethylene having a density of 0.950 g/cm$^3$ and having high wear resistance.

TEXT EXAMPLES

Dissolution Test for Heavy Metals and Harmful Substances

Lead-free brass, non-toxic polyethylene, brass, and high-density polyethylene that are materials used to manufacture the water treatment apparatuses according to the embodiment and the comparative example are taken as samples, and the samples are tested according to NSF-ANSI Standard 61 (for Drinking Water System Components) of American National Sanitation Foundation and the test results are shown in Table 1.

TABLE 1

| | | Test Results | | |
|---|---|---|---|---|
| | | Result (value) | | |
| Test item | Unit | Embodiment | Comparative Example | Sample |
| Pb | µg/l | — | 0.67 | Water condition, pH 5 |
| Pb | " | — | 0.42 | Water condition, pH 10 |
| Cu | " | 0.62 | 67.6 | Water condition, pH 5 |
| Zn | " | 17 | 121.2 | Water condition, pH 5 |
| Butadiene | " | — | — | Water condition, pH 5 |
| DEHP | " | — | 0.54 | Water condition, pH 8 |
| Phenol | " | — | 86.6 | Water condition, pH 8 |
| TPPO | " | — | 0.23 | Water condition, pH 8 |

*DEHP: Di(2-EthylHexyl)Phthalate
TPPO: TriPhenyl Phosphate

As shown in Table 1, the lead-free brass and non-toxic polyethylene used for the embodiment are compared with the brass and high-density polyethylene used for the comparative example. Heavy metals such as lead (Pb) and harmful substances are not detected in water that is in contact with the lead-free brass and non-toxic polyethylene used for the embodiment. Therefore, the test results show that the lead-free brass and non-toxic polyethylene are not harmful to the human body.

As of Jun. 4, 2015, IOR-50N that is the product name of a water treatment apparatus (scale removal system) manufactured by Iorex Co. Ltd, who is the applicant of the present invention, has passed the test as described in ANSI/NSF 61 that is the certification standard for water quality, established by NSF International (American National Sanitation Foundation) (See FIG. 6). That is, the water treatment apparatus of the present invention is internationally certified to be safe in terms of sanitation and have high quality.

Although the preferred embodiment of the present invention has been disclosed for illustrative purposes, those skilled in the art will appreciate that various modifications, additions and substitutions are possible, without departing from the scope and spirit of the present invention as disclosed in the accompanying claims.

The invention claimed is:
1. A water treatment apparatus for treating water without producing harmful substances, the apparatus comprising:
a hollow body casing (10) serving as an outer shell, arranged at a middle portion of the water treatment apparatus, and provided with side couplings (10a) combined with left and right ends thereof;
a body holder (50) accommodated in the body casing (10) and connected to flange retainer 20 arranged at left and right sides thereof via respective connection covers (40); and
a carbon pipe (63) accommodated in the body holder (50), having a water channel (63a) through which water flows, provided with covers (46) attached to left and right ends thereof, and generating static electricity in water;
a rod (62) made of aluminum and installed in a middle portion of the carbon pipe (63); and
inner rods (61) disposed inside the rod (61) and arranged at left and right end portions of the rod (62),
wherein the connection covers (40) and the flange retainers (20) are made of lead-free brass that is a metal alloy containing copper (Cu) by 58.7316 wt %, lead (Pb) by 0.0035 wt %, iron (Fe) by 0.0182 wt %, tin (Sn) by 0.097 wt %, cadmium (Cd) by 0.0004 wt %, bismuth (Bi) by 1.0405 wt %, and zinc (Zn) by the remaining proportion, and wherein the inner rods (61) and the covers (64) are made of ultra high molecular weight polyethylene having a molecular weight of 5.0 to $6.8 \times 10^6$ and containing no additive, thereby being non-toxic.

* * * * *